US012084972B2

(12) United States Patent
Morrison

(10) Patent No.: US 12,084,972 B2
(45) Date of Patent: Sep. 10, 2024

(54) VEHICLE AND PROCESS FOR MOVING COARSE ORE

(71) Applicant: Douglas Morrison, Etobicoke (CA)

(72) Inventor: Douglas Morrison, Etobicoke (CA)

( * ) Notice: Subject to any disclaimer, the term of this patent is extended or adjusted under 35 U.S.C. 154(b) by 218 days.

(21) Appl. No.: 17/594,112

(22) PCT Filed: Apr. 2, 2020

(86) PCT No.: PCT/CA2020/050435
§ 371 (c)(1),
(2) Date: Oct. 1, 2021

(87) PCT Pub. No.: WO2020/198869
PCT Pub. Date: Oct. 8, 2020

(65) Prior Publication Data
US 2022/0162941 A1    May 26, 2022

(30) Foreign Application Priority Data
Apr. 3, 2019    (CA) .................................... 3038952

(51) Int. Cl.
*E21F 13/08*    (2006.01)
*B65G 41/00*    (2006.01)
(Continued)

(52) U.S. Cl.
CPC .......... *E21F 13/083* (2013.01); *B65G 41/002* (2013.01); *E21F 13/061* (2013.01); *G05D 1/0214* (2013.01)

(58) Field of Classification Search
CPC ..... E21F 13/083; E21F 13/061; B65G 41/002
See application file for complete search history.

(56) References Cited

U.S. PATENT DOCUMENTS 2,325,730 A    8/1943   Arentzen et al.
2,637,456 A    5/1953   Felderman
(Continued)

FOREIGN PATENT DOCUMENTS

CA    1002082 A    12/1976
CA    2075751 A1   11/1993
(Continued)

OTHER PUBLICATIONS

European Patent Application No. 20784474, Extended European Search Report, dated Nov. 7, 2022.
(Continued)

*Primary Examiner* — Peter D Nolan
*Assistant Examiner* — Tanya C Sienko
(74) *Attorney, Agent, or Firm* — MARSHALL, GERSTEIN & BORUN LLP

(57) ABSTRACT

Disclosed are vehicles used in transporting coarse ore in a mine and systems using the same. The vehicles include a drive mechanism for moving the vehicle along a surface; an inclinable conveyor positioned atop the drive mechanism for moving the coarse ore from a loading position to a discharge position; and vertically extending walls positioned along the longitudinal sides of the conveyor. The loading position of the conveyor being offset from the vertically extending walls and the discharge position of the conveyor extends beyond the vertically extending walls so that one vehicle can be positioned with respect to another to form a continuous walled conveyor. The vehicles and systems described herein do not require rails, so they can be maneuvered within a mine to form a network from the mine face to a coarse ore unloading area.

14 Claims, 6 Drawing Sheets

(51) Int. Cl.
    *E21F 13/06*     (2006.01)
    *G05D 1/00*      (2024.01)

(56) References Cited

U.S. PATENT DOCUMENTS

| | | | | |
|---|---|---|---|---|
| 3,593,838 A * | 7/1971 | Latone | ............... | G03G 15/0801 |
| | | | | 198/713 |
| 3,827,721 A * | 8/1974 | Coval | .................... | B62D 13/04 |
| | | | | 280/400 |
| 5,634,545 A | 6/1997 | Plumley | | |
| 2004/0054434 A1* | 3/2004 | Sturges | ................ | E21F 13/083 |
| | | | | 700/213 |
| 2007/0217872 A1* | 9/2007 | Gross | ................... | E21F 13/025 |
| | | | | 406/40 |
| 2012/0146387 A1 | 6/2012 | Shatters | | |
| 2016/0115791 A1* | 4/2016 | Oberdorfer | ............ | E21F 13/02 |
| | | | | 198/812 |
| 2016/0237820 A1 | 8/2016 | Kodama et al. | | |

FOREIGN PATENT DOCUMENTS

| | | | | | |
|---|---|---|---|---|---|
| CA | 2674700 A1 | | 6/2008 | | |
| CA | 2740268 A1 | * | 11/2012 | ............. | B65G 15/08 |
| GB | 980039 A | | 1/1965 | | |
| GB | 1070826 A | | 6/1967 | | |

OTHER PUBLICATIONS

International Application No. PCT/CA2020/050435, International Search Report and Written Opinion, mailed Jun. 5, 2020.

\* cited by examiner

VEHICLE AND PROCESS FOR MOVING COARSE ORE

CROSS REFERENCE TO RELATED APPLICATIONS

This application is the U.S. national phase of PCT Application No. PCT/CA2020/050435, filed on Apr. 2, 2020, which claims priority to Canadian Application No. 3038952, filed Apr. 3, 2019, the entire disclosures of which are hereby incorporated by reference in their entirety.

FIELD OF THE INVENTION

The present invention generally relates to mining. More specifically, the invention relates to a transport vehicle, system and process for moving coarse ore in an underground or surface mine.

BACKGROUND OF THE INVENTION

The transportation of coarse ore in any mine relies on the movement of ore-carrying equipment to carry it to the primary crusher. This equipment includes load, haul, dump (LHD) machines, dump trucks, shuttle cars and similarly purposed machinery. Since these machines must make trips back and forth from the mine face to the unloading area, the overall production rate of the mine can be limited as a result of the time it takes to move the coarse ore from the face. Moreover, since these machines return to the mine face from the unloading area empty, the machines are at most only 50% fuel-efficient, which adds significantly to the overall cost of the mining operation.

Conveyor belt systems have been developed to move material in soft-rock mines such as coal or salt when the ore is relatively low-density and low abrasiveness. In hard-rock metal mines where the ore is high-density and highly abrasive, however, conveyor systems are often restricted to moving crushed rock, which is significantly more uniform in size and causes less wear than coarse ore. In addition, the conveyor belts used in mines are often fixed installations or require a rail system and they are well-suited to the straight line geometry of coal and salt mines. The more permanent nature of these types of installations, as well as the raw nature of coarse ore compared to crushed rock, does not allow these systems to be used in the movement of coarse ore in hard-rock metal mines from the mine face to the crusher, for example, when the geometry of the ore sources and the tunnels or drifts through which the ore must pass are highly variable.

There is a need for vehicles, systems and processes that are robust enough to move coarse ore throughout the mine, which are more continuous in operation and adaptable to the ever-changing landscape and geometry of an active hard-rock metal mining operation.

SUMMARY OF THE INVENTION

According to an aspect of the present invention, there is provided a vehicle for transporting coarse ore in a mine. The vehicle having a drive mechanism for moving the vehicle along a surface; an inclinable conveyor positioned atop the drive mechanism for moving the coarse ore from a loading position to a discharge position; and vertically extending walls positioned along the longitudinal sides of the conveyor. The loading position of the conveyor being offset from the vertically extending walls and the discharge position of the conveyor extending beyond the vertically extending walls.

In one embodiment, the drive mechanism is electrically powered.

In another embodiment, the drive mechanism is sectioned and each section is connected by an articulating connection.

In a further embodiment, the drive mechanism is remotely or autonomously controlled.

In a still further embodiment, location and hazard sensors are positioned on the vehicle to allow for the vehicle to be autonomous.

In yet a further embodiment, the inclinable conveyor is mounted to the drive mechanism via posts.

In yet another embodiment, the posts are adjustable to allow the distance between inclinable conveyor and the drive mechanism to be adjusted.

In one embodiment, the conveyor is a chain conveyor. The chains driving guides that move the coarse ore from the loading position to the discharge position. In some cases, the chain conveyor is powered by a separate engine from the drive mechanism.

According to another aspect of the present invention, there is provided a trackless system for transporting coarse ore from a mine face. The system having: a network of vehicles as described above. The vehicles being arranged so that the discharge position of one conveyor is positioned near the loading position of a second conveyor.

According to a further aspect of the present invention, there is provided a method of transporting coarse ore from a mine face. The method comprising the steps of: loading coarse ore onto the conveyor of the vehicle as described above; moving the coarse ore from the loading position to the discharge position of the conveyor; and discharging the coarse ore from the conveyor into a loading area.

BRIEF DESCRIPTION OF THE DRAWINGS

These and other features, aspects and advantages of the present invention will become better understood with regard to the following description and accompanying drawings wherein.

DESCRIPTION OF THE INVENTION

The following description is of one particular embodiment by way of example only and without limitation to the combination necessary for carrying the invention into effect.

The vehicles and system disclosed herein enable a continuous flow of broken material, rock or ore, which is distinct from the batch flow of material employed by conventional mining equipment and systems. The system described herein disconnects the flow of rock and ore from the orientation and movement of the ore transfer vehicles in traditional systems. The system described herein moves ore using vehicles that are stationary and that move product forward or backward, in a straight line with connecting units when it is necessary to change orientation. Conventional batch flow equipment moves rock or ore by continuously moving the vehicles, so that the movement of the rock or ore is tied directly to the movement of the vehicles. This is both energy- and time-inefficient, whereas the speed of delivering the ore in the present system depends on the speed of the conveying system, not the speed of the vehicles which are stationary.

The system described herein uses only the energy necessary to move the product and it does so continuously, without waiting for the batch vehicles to return empty. The result is a far higher ore transfer rate with much lower horsepower demand than traditional required. In addition, when operating as an autonomous system, the labour cost is a small percentage of the conventional ore transportation system.

The system described herein is designed to allow continuous access for ventilation air or other utility vehicles to pass rather than using equipment so large that it blocks the passage of air or other vehicles while it is in operation. The vehicles described herein are designed with simple, modular components that are easily replaceable. These factors eliminate most of the labour cost involved in movement of ore and rock. The system described herein is estimated to reduce the labour and energy cost to around 50% of the current cost and increase the ore transfer rate by a factor of 2 or 3.

The vehicles and system disclosed herein are designed for the movement of coarse ore or material in a surface or underground mining operation. Underground, coarse ore is generated during the mining process after drilling and/or blasting at the mine face. Unlike ore that has been passed through a crusher, coarse ore is irregular in shape and size, often weighing significantly more than ore after comminution. As such, mining equipment used to move crushed ore is insufficient to move coarse ore.

Figure 1:
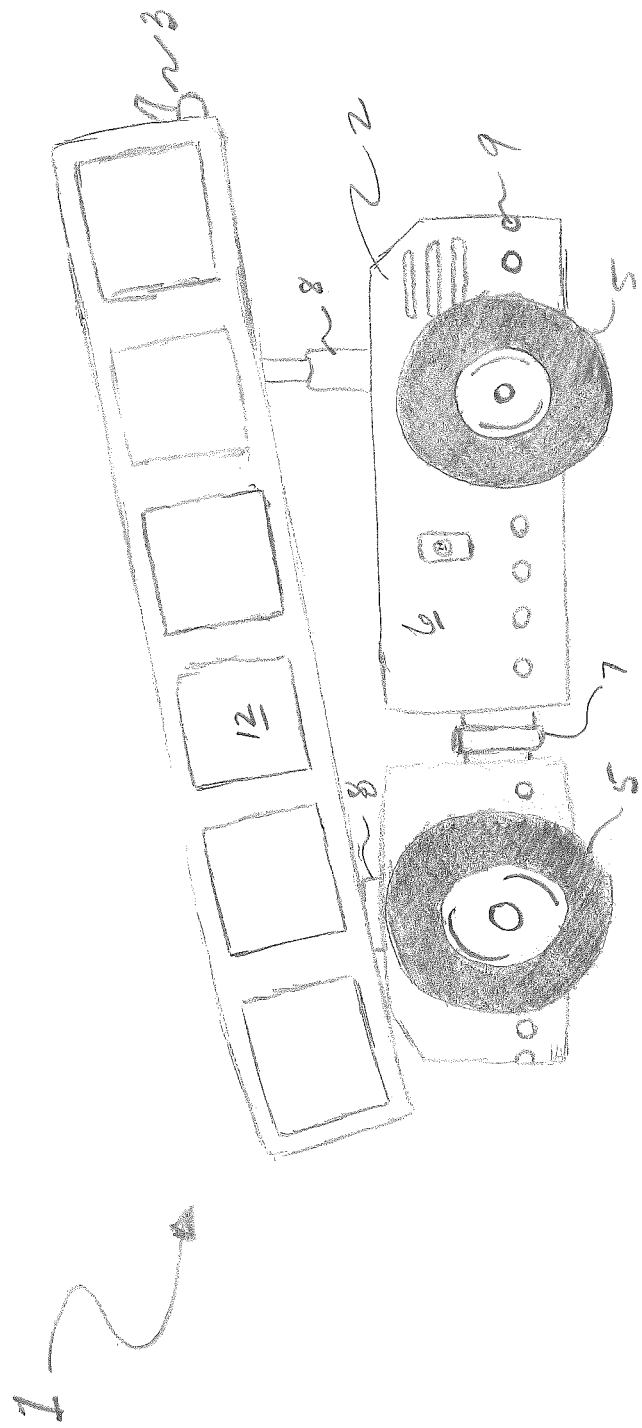
FIG. 1 shows a vehicle according to an embodiment of the invention.

As shown in FIG. 1, a vehicle (1) is provided for transporting coarse ore in a mine. The vehicle (1) contains a drive mechanism (2) for moving the vehicle (1) along a surface. Atop the drive mechanism (2), an inclinable conveyor (3) is provided for moving the coarse ore from a loading position to a discharge position. The inclinable conveyor (3) having vertically extending walls (12) positioned along the longitudinal sides of the conveyor (3).

The drive mechanism (2) of the vehicle (1) allows the vehicle (1) to maneuver throughout a mine without the use of rails or being towed by another vehicle. As such, the drive mechanism (2) will typically have wheels (5) or tracks, which are powered by a drive shaft and motor, to allow the vehicle (1) to move freely within a mine. In an effort to reduce the pollution in a mine, the drive mechanism (2) can be electrically powered via a bank of rechargeable batteries. However, it will be understood that the drive mechanism (2) can be powered by conventional fossil fuels, or a hybrid system comprising electricity and fossil fuel.

The body (6) of the drive mechanism (2) can take many different forms, such as that shown in FIG. 1, where the body of the drive mechanism (2) is split into two sections that are connected by an articulating connection (7). This particular arrangement will provide increased maneuverability within the mine.

In a preferred, but not limiting, embodiment, the drive mechanism (2) does not contain manual controls for an operator, i.e. steering wheel, manual accelerator and brakes, but instead can be driven remotely or autonomously using pre-programmed commands and/or artificial intelligence. In the case where the vehicle is controlled by remote control, a receiver is incorporated into the drive mechanism (2) so that input from a remote location can be received and converted into movement of the vehicle (1). The remote transmitter can be in the form of a handheld device or centralized control room.

When the drive mechanism (2) allows the vehicle (1) to be driven autonomously, sensors (9), such as proximity sensors using lasers and radar, for example, are incorporated into the various components of the vehicle (1) so that the environment of the vehicle can be detected, understood and mapped. For example, proximity to other vehicles, workers, obstacles and the mine can be determined through the sensors (9). This information is relayed to a central processing unit that uses the information about the environment to control movement of the vehicle (1).

A hybrid system where the drive mechanism (2) is designed to be remotely controlled at times and to operate autonomously at times can be provided to allow the vehicle (1) to move throughout the mine via remote control, whereas alignment with other vehicles (1) or other mining machines can take place autonomously.

In addition to allowing the vehicle (1) to move around a mine, the drive mechanism (2) also provides a platform for the conveyor (3) to be mounted to via posts (8). In one embodiment, the conveyor (3) can be mounted to the drive mechanism (2) via adjustable posts (8) so that the distance between the conveyor (3) and drive mechanism (2) can be adjusted. This includes independently adjusting the distance between each end of the conveyor (3) and the drive mechanism (2) so that the angle of incline of the conveyor (3) can be controlled based on the application. In some embodiments, the adjustable posts (8) are either hydraulic or pneumatic cylinders (8) positioned in the vicinity of the ends of the conveyor (3) to control the distance between the conveyor (3) and the drive mechanism (2). In other embodiments, the distance between the conveyor (3) and the drive mechanism (2) can be fixed via the posts (8), including providing a fixed angle of incline for the conveyor (3).

When the drive mechanism (2) is articulated, as shown in FIG. 1, the posts (8) may be movable with respect to drive mechanism (2), which will prevent the conveyor (3) from becoming twisted while the vehicle (1) moves around corners in the mine. For example, the posts (8) can be positioned within or on a track on the drive mechanism (2) so that the posts (8) can move independently of the drive mechanism (2).

In one embodiment, the width of the vehicle (1) will be no more than half, preferably no more than 40%, the width of the access tunnels or drifts of the mine. For example, when the access tunnels or drifts of the mine are a standard 5 metres wide, the preferred width of vehicle (1) would be between 2-2.5 metres wide, preferably approximately 2 metres wide, and approximately 5 metres long, with the drive mechanism (2) being approximately 3.5 metres long. Similarly, when the access tunnels or drifts of the mine are 6 metres wide, the width of the vehicle (1) should be approximately 2.4 metres wide. A vehicle (1) of these dimensions is easily maneuverable within a conventional mine. Moreover, the dimensions of such a vehicle (1) will allow for two vehicles to pass each other in an access tunnel or drift, or at any time operate in tandem side-by-side.

Figure 2:
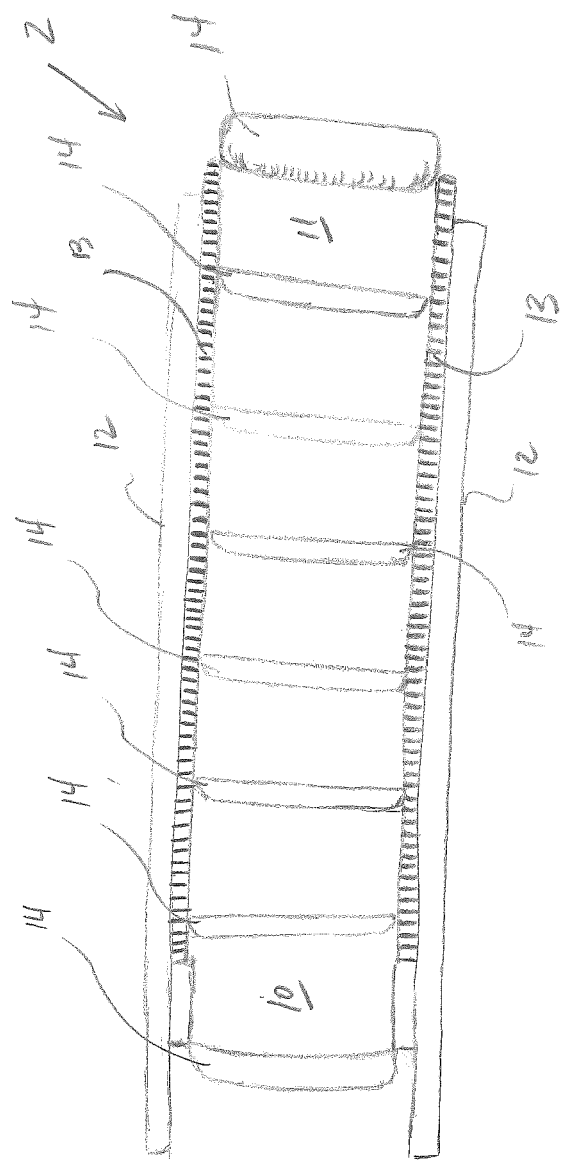
FIG. 2 is a top plan view of a conveyor according to an embodiment of the invention.

As mentioned above, a conveyor (3) is positioned atop the drive mechanism (2). The conveyor (3) moves coarse ore from a loading position (10) to a discharge position (11). As shown in FIGS. 1 and 2, vertically extending walls (12) are positioned along the longitudinal sides of the conveyor (3)

to prevent spillage of the coarse ore off the sides of the conveyor (3). These walls (12) can be removably or permanently attached to the vehicle (1), or can be independent units that are positioned near the vehicle (1) and conveyor (3) to prevent spillage from the conveyor (3). Preferably, the walls (12) will be made from steel to limit the damage caused by repeated impact with the coarse ore.

In order for one or more vehicles (1) to be linked together, as described below, it is preferable that the loading position (10) of the conveyor (3) is offset from the walls (12) and the discharge position (11) of the conveyor (3) extends beyond the walls (12). This arrangement allows for the conveyor (3) of a first vehicle (1) to overlap with the conveyor (3) of a second vehicle (1), thus providing a continuous conveyor system to be constructed that also has a continuous wall to limit spillage along length of the conveyor(s).

The conveyor (3) should be an industrial conveyor capable of moving ore that is random in both size and shape, and thus random in terms of weight. For example, a chain conveyor can be used to move the coarse ore. In this embodiment, the chain conveyor will include continuous chains (13) running the length of each side of the conveyor (3). The chains (13) can be rotated by one or more spindles positioned beneath the conveyor (3). The spindles are driven by the same motor used for the drive mechanism (2) or can be powered by a separate motor. As a built-in safety precaution, a switch can be installed to prevent the motor(s) from operating both the conveyor and drive mechanism at the same time. In order to keep emissions to a minimum in the mine, the use of electric motors can be used to move the spindles. For the purposes of the present discussion, "motors" can be run on electricity and/or combustion. Electric motors can be powered via onboard batteries or can be plugged in directly to a power source when the vehicle is stationary. The onboard batteries can be recharged when the vehicle is stationary by plugging the unit directly into a power grid or a supercharger.

The chains (13) drive guides (14), such as steel plates or scoops, that are interspaced along the chains (13). The guides (14) drag the coarse ore along the conveyor (3) from the loading position (10) to the discharge position (11).

Figure 4:
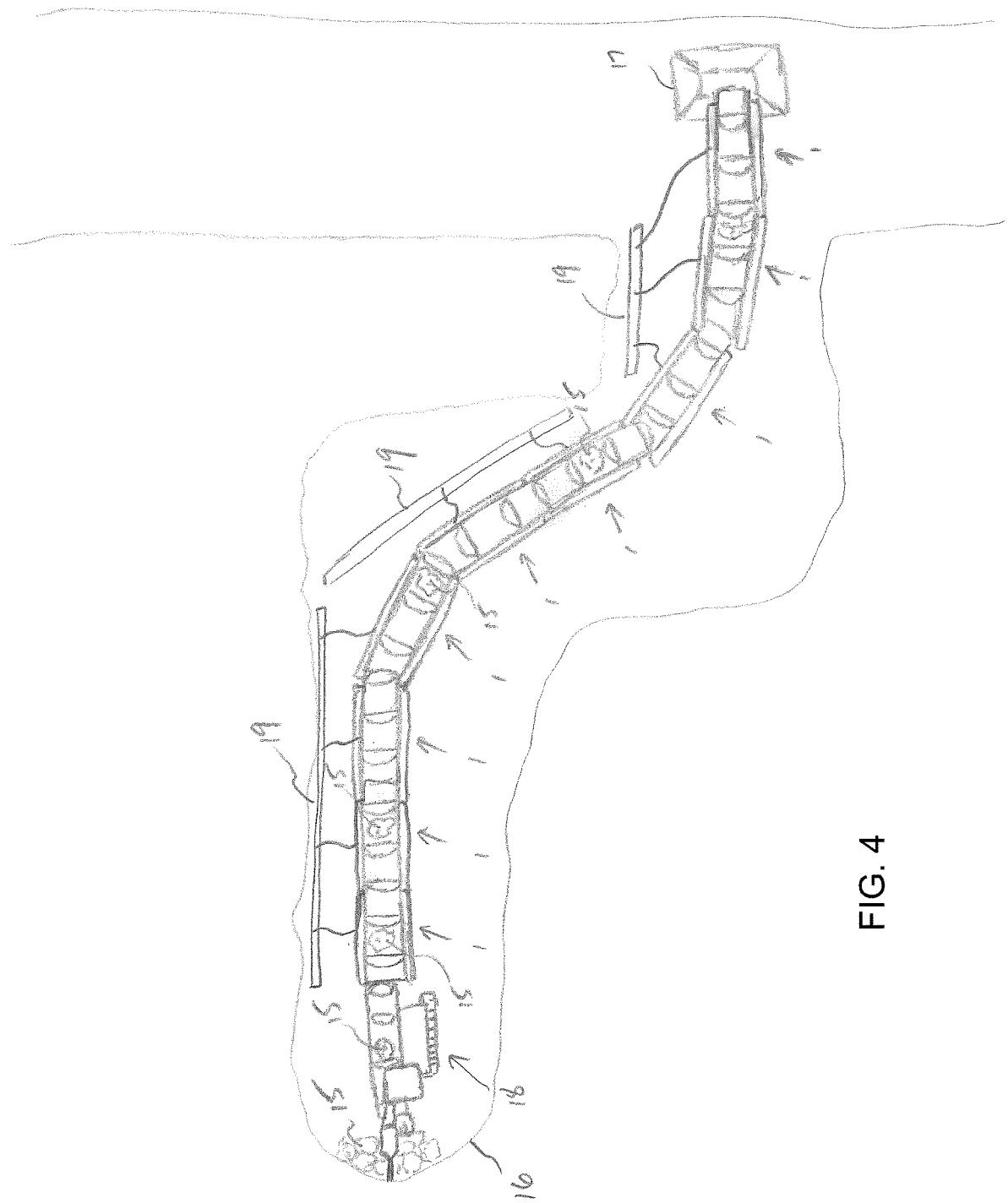
FIG. 4 shows a network of vehicles aligned in a mine according to an embodiment of the invention.

In operation, multiple vehicles (1) will be arranged to form a network (as shown in FIG. 4) to transfer the coarse ore (15) from a mine face (16) to a dumping location (17), such as a rock crusher, conventional train haulage system, or storage bin. Typically, the system described herein is used in conjunction with a machine capable of transferring raw material (18), such as a continuous loader. Although continuous loaders are known in the art, the dimensions of these vehicles typically do not lend themselves to optimal production levels within the system described herein. For example, in order to permit movement of the continuous loader within the access tunnel or drift, when the vehicles (1) are in place, the width of the continuous loader should be less than half the width of the access tunnel or drift. Based on a standard 5 metre wide access tunnel or drift, the smallest commercial available continuous loader that would work within this environment is 2.2 metres wide. However, since conventional continuous loaders are usually operated with a side car, the actual width of the conveyor is typically 1 metre. If the width of conveyors (3) of vehicles (1) are typically between 1.6 to 1.8 metres wide, then the overall production rate of the system will be limited by a continuous loader with a conveyor being 1 metre wide. Therefore, a continuous loader having a conveyor with a width that is equal to or greater than the width of the conveyor (3) of vehicle (1) is preferred. In order to maintain maneuverability, the continuous loader has a conveyor that is around 2 metres. To maximize loading capability, the continuous loader has a feeder pan that is 2 metres in width when in transport mode (i.e. when driving to the mine face), but can expand to 3 metres in width when in operation (i.e. when moving rock from the face of the mine).

Figure 3:
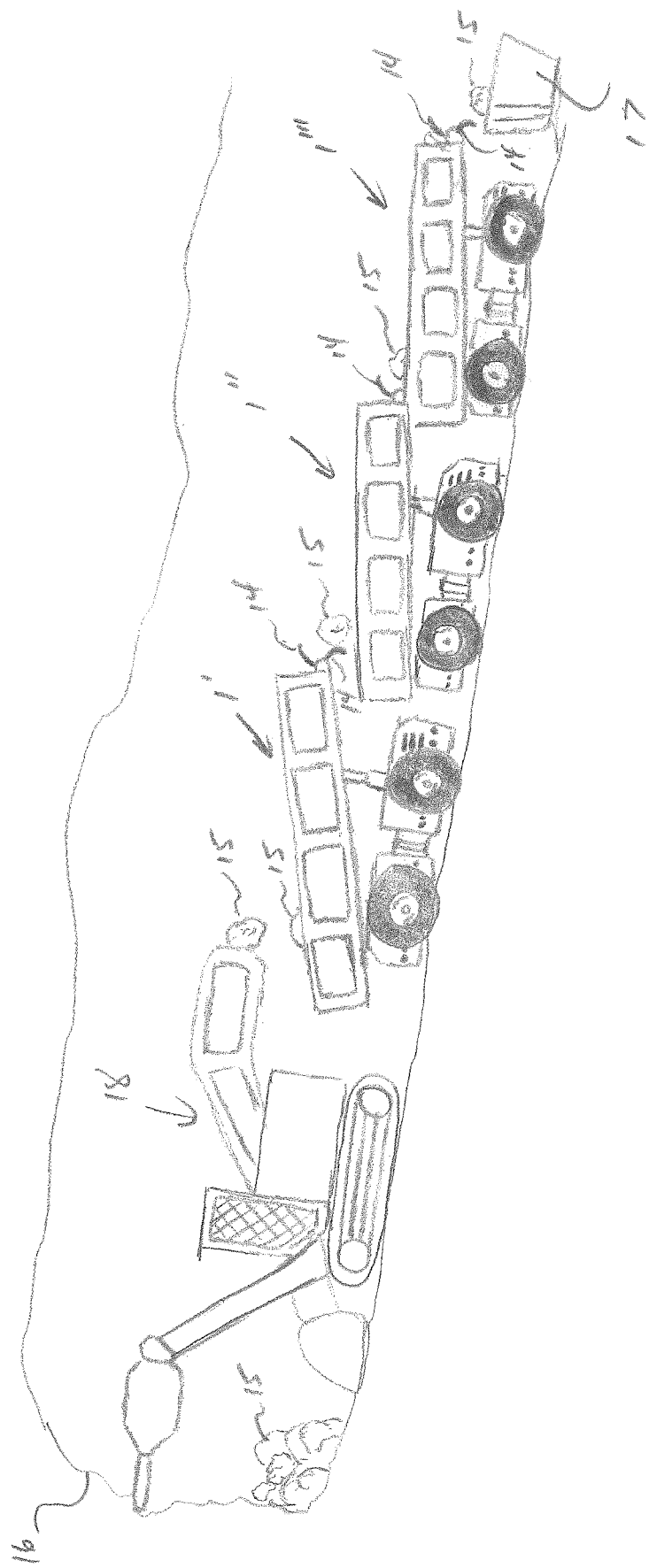
FIG. 3 shows a series of vehicles in operation according to an embodiment of the invention.

As shown in FIG. 3, the coarse ore (15) is deposited, preferably from a continuous loader as described above, onto the loading position of the conveyor of the first vehicle (1') in the network. The guides (14) of the conveyor (3) drag the coarse ore (15) to the discharge position of the conveyor (3), which results in the coarse ore (15) being deposited onto the loading position of the conveyor (3) of the second vehicle (1") in the network. This sequence is continued until the coarse ore (15) enters the last vehicle in the network, represented by 1''' in FIG. 3. The coarse ore (15) from the last vehicle (1''') is discharged into the dumping location (17), such as a chute (20) (as described below), for further processing.

Figure 5:
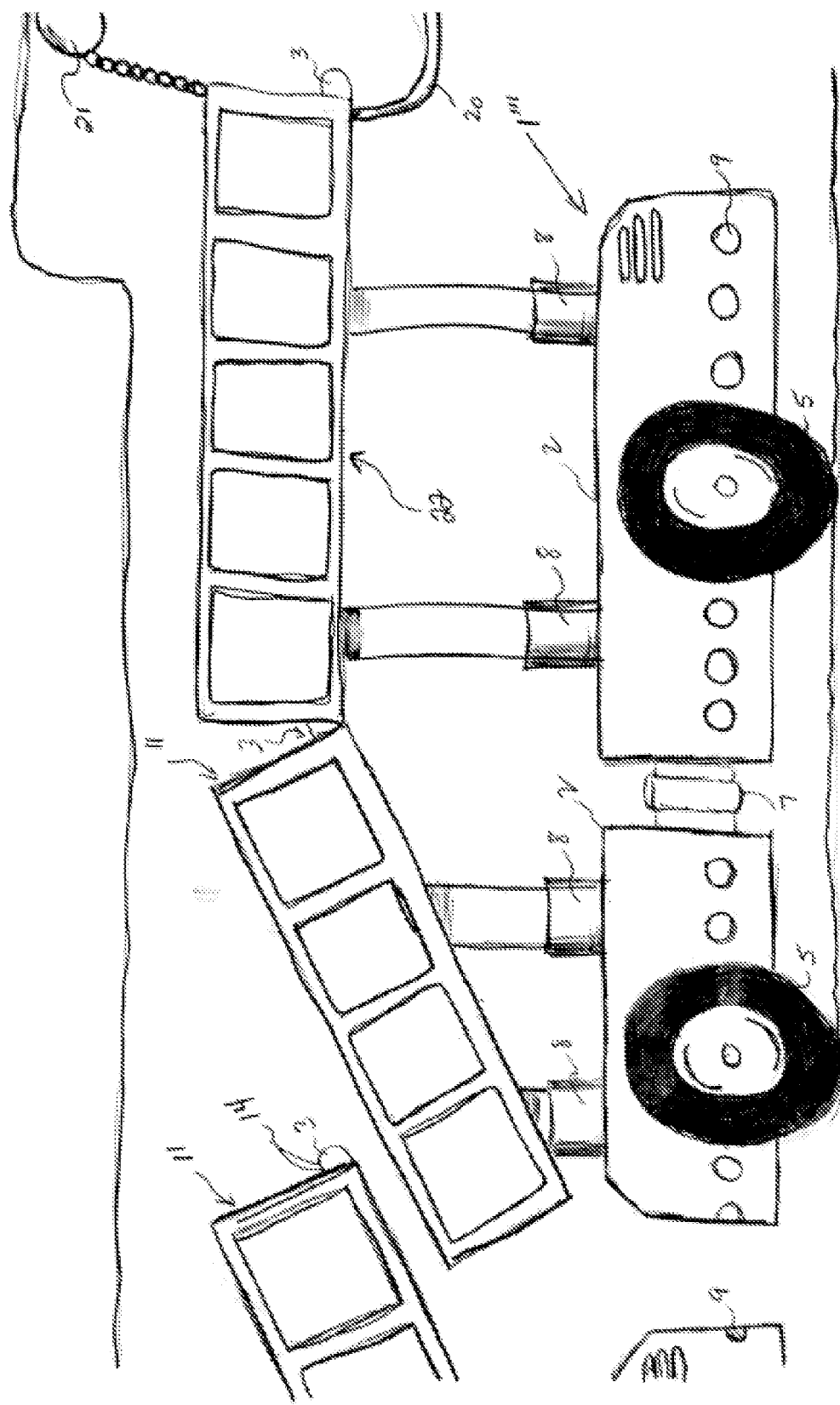
FIG. 5 shows a vehicle according to an embodiment of the present invention for discharging material into a chute.

As shown in FIG. 5, the vehicle (1''') that discharges the coarse ore (15) into the dumping location (17) can be modified so that an extension (22) is provided at the discharge end (11) of conveyor (3). The extension (22) can be extended horizontally from the discharge end (11) of the regular vehicle (1). In some embodiments, the extension (22) is between 0.2 m to 1.5 m long. The extension (22) can also be elevated vertically higher than its normal position. When the extension (22) is in operation, the main conveyor (3) has to be inclined at the discharge end (11) in order to ensure it discharges into the extension (22). In addition, the conveyor (3) also has to get longer in order to be able to feed into the extension (22). It does this by extending the overlapping plates in the floor of the conveyor (3) and extending the chain by re-positioning the third spindle below the conveyor (3). This positioning allows the vehicle (1''') to feed into the transfer chute (20) described below.

Normally, the extension (22) will be at the discharge end (11) of the conveyor (3); however, in some cases, the system can be reversed with the extension (22) being at the loading position (10) of the conveyor (3). In this case, this vehicle (1) can be brought into position with a vehicle (1''') with the extension (22) being at the discharge end (11) to form a bridge. In this case, when both extension sections (22) of the vehicles are elevated simultaneously to the same height, mobile vehicles can pass under the elevated section. This ensures access to other excavations at right angles to the network of vehicles, but without interrupting the flow of ore along the source drift.

As shown in FIG. 4, multiple vehicles (1) can be used to form the network that can stretch throughout the mine, including navigating around corners and obstacles. When the vehicles (1) are electrically powered, they can use the energy stored in onboard batteries to move into position within the mine, but when parked and transporting the coarse ore (15), each vehicle can be plugged into a stationary power source (19) to recharge the batteries and supply power to the motor responsible for moving the conveyor (3).

The vehicles (1) used within this system are typically positioned along one side of the access tunnel or drift (i.e. not in the middle of access tunnel or drift). This arrangement allows for additional vehicles, such as the vehicles described herein, and workers to pass-by the aligned vehicles (1) of the system. Moreover, this arrangement allows for disabled vehicles (1) or vehicles requiring routine maintenance to be quickly, and efficiently, removed and replaced from the system. The process of removing and replacing vehicles can occur autonomously or semi-autonomously where some actions are remotely controlled.

In order to remove a vehicle (1) from the network, the inclinable conveyor (3) can be elevated at the discharge end (11) so that the bottom of the conveyor (3) can traverse over the containment wall (12) of the vehicle (1') in front of it. In most cases, the movable axle of the vehicle (1) will be at the discharge end of the vehicle (1) and this configuration allows a vehicle (1) in the middle of the network to be extricated and replaced by another vehicle (1') using parallel-parking-type movements. Elevating the conveyor (3) of the departing vehicle (1) and the conveyor (3) of the vehicle (1') behind it, allows the departing vehicle (1) to reverse towards the vehicle (1') behind it, while turning the axle so that the elevated conveyor (3) of the departing vehicle (1) will pass over the walls (12) of the vehicle (1") in front of it. The departing vehicle then drives forward into the passing aisle and positions itself parallel to the vehicles in front it. It then moves forward at least two more vehicle lengths. This creates a gap of one vehicle-length in the network of vehicles. While the departing vehicle is moving out of its operational position, the replacement unit is positioned two vehicle lengths behind it in the passing aisle. Once the departing vehicle has moved forward in the passing lane, the replacement unit moves forward to a position parallel to the unit in front of the gap in the network.

Once in the correct position in the passing aisle (just as in cars preparing for parallel parking) the replacement unit then elevates its conveyor and reverses into position with the receiving end of its conveyor under the elevated conveyor of the vehicle behind the gap. The replacement unit then turns its axle to move forward to position the unit in the gap. It moves forward and back until the conveyor of the replacement unit is aligned with the vehicle in front and it lowers its conveyor to fit into the end of the vehicle in front. As this is happening, the conveyor of the vehicle behind the gap lowers its conveyor to fit into the trough formed by the conveyor and walls of the replacement unit. The replacement process is now complete, and the replacement unit can start to operate in concert with the vehicles in front and behind it, allowing material to flow from one vehicle to the next as before.

Once the vehicles are in position to execute the transfer, they can signal the loader to stop loading for a certain period, creating a gap in the flow of material in the network. Once this 'ore gap' arrives, the vehicles begin to move out and in, so that when they are almost back in position they can signal the loader to being loading again, ensuring ore is delivered to the replacement vehicle very shortly after it begins operating. This minimizes the delay in ore flow while replacing vehicles.

In order to allow for material transfer from a source drift to an adjacent drift, a transfer chute may be provided. The transfer chute is suspended at the end of the source drift and directs the flow of material from the elevated discharge position (11) of one vehicle (1) to the loading position (10) of a second vehicle (1'). In one embodiment, the transfer chute (20) is attached to a pipe (21) that is bolted to the roof of the adjacent drift above the entrance of the source drift. In this case, the transfer chute (20) is hung from the pipe (21) and can be slid from one end to the other, depending upon which side the material needs to be transferred. The transfer chute (20) is walled to prevent material from falling from the chute (20) onto the ground below. In most cases, the transfer of material in the chute (20) occurs via gravity, by providing the chute (20) at a slight decline from the loading area to the discharge area. The transfer can be aided by replacing the floor of the chute (20) with rollers. The use of a transfer chute (20) to bridge these gaps in the drifts allows for access to the drifts without having to stop production.

The pipe (21) can also be used to used to hang blasting mats when hang-ups or oversize material make it necessary to blast inside the source drift. The blasting mat can be hung from the pipe (21) above the source drift entrance via two or more large hooks in order to contain fly-rock from the blast while allowing the air concussion to pass. The vertically hung blasting mat protects the chute (20) and any vehicles in the adjacent drift from the outcome of the blast. After the blast, the hanging blasting mat can be disconnected from the pipe (21) and loaded into a utility vehicle by the loader's hydraulic arm before the loader re-enters the source drift to clean-up the drift and begin loading.

The system described herein is primarily designed to move ore rapidly on horizontal or slightly inclined surfaces, such as found in tunnels, drives or drifts. However, occasionally it may be preferable to move ore vertically from one level to another. In order to move material vertically from one level to another, one or more additional modified vehicles are required to facilitate the delivery of ore in deep underground mines. In this case, the vehicle is modified to include a conveyor that contains a guide (14) in form of an inclined steel bucket. These modified vehicles would be fed by vehicles or chutes on the lower level and would feed into similar vehicles on the upper level. In another embodiment, the vehicles and system described herein can be adapted for surface mining operations. The vehicles designed for surface operations are less constrained by the physical dimensions of an underground mine. As such, the vehicles are designed to be larger than the vehicles used underground. For example, vehicles with a 2.4 m wide conveying system in the floor of the trough, 3 m wide at the top of the containment walls and 10 m long can be accommodated in a surface mining operation.

The ore loading equipment in surface operation is usually much more efficient than the loading vehicles in underground mines, so while larger versions of the underground continuous loaders might be used, conventional open-pit loading equipment would be sufficient to load the surface vehicles described above. The loading system would also use a steel grizzly to remove over-size material and a hopper system to control the rate of flow of material on to the surface vehicles.

Figure 6:
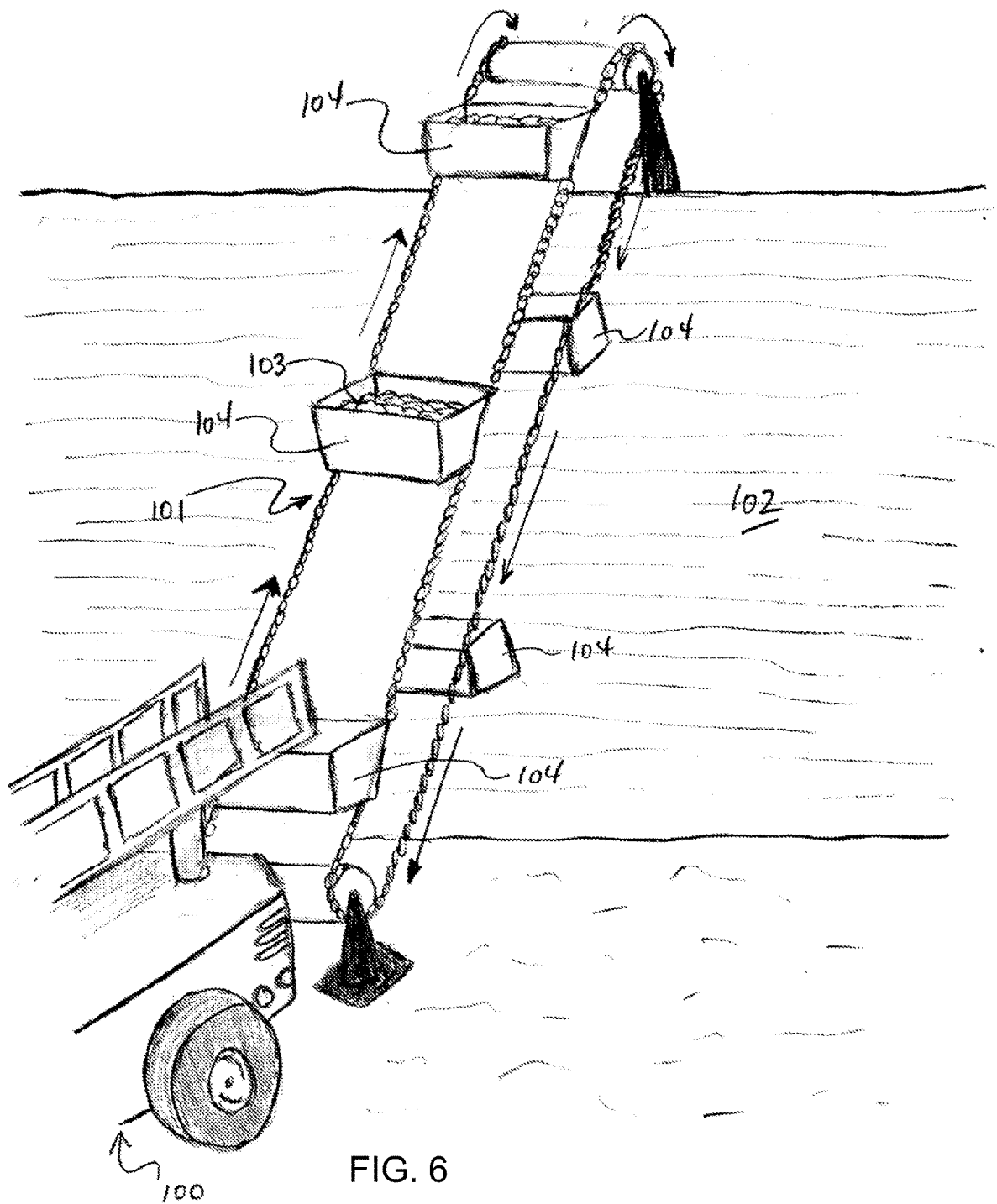
FIG. 6 shows a large-scale steel bucket conveyor for use in surface mining operations.

As shown in FIG. 6, the discharge from the surface vehicles (100) are into large-scale steel bucket (104) conveyors (101) fixed to the side of the pit wall (102). These would use the inclined roadway or ramp to fix the conveyor (101) to the pit wall (102) and so deliver material (103) to the top of the open-pit. The configuration still allows for utility and supply vehicles to be able to pass along the mine ramp or declines and pass underneath the conveying system (101). This would replace the series of conventional trucks that operate at around 10 km/hour and travel along a distance 10 times the depth of the pit, consuming 60% of the energy for the trip. An inclined all-electric conveyor system (101) containing the surface vehicles described above can move material much more quickly than haul trucks and can achieve this at less than 40% of the current energy used by the trucks.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

The invention claimed is:

1. A vehicle for transporting coarse ore in a mine, said vehicle comprising:
   a drive mechanism for moving the vehicle along a surface;
      wherein the drive mechanism is sectioned and each section is connected by an articulating connection;
   an inclinable conveyor positioned atop the drive mechanism for moving the coarse ore from a loading position to a discharge position;
      wherein the inclinable conveyor is mounted to the drive mechanism via posts and these posts are moveable within a track on the drive mechanism to prevent twisting of the conveyor when the drive mechanism is articulated; and
   vertically extending walls positioned along the longitudinal sides of the conveyor,
      wherein the loading position of the conveyor is offset from the vertically extending walls and the discharge position of the conveyor extends beyond the vertically extending walls.

2. The vehicle of claim 1, wherein the drive mechanism is electrically powered.

3. The vehicle of claim 1, wherein the drive mechanism is remotely or autonomously controlled.

4. The vehicle of claim 3, wherein location and hazard sensors are positioned on the vehicle to allow for the vehicle to be autonomous.

5. The vehicle of claim 1, wherein the posts are adjustable to allow the distance between the inclinable conveyor and the drive mechanism to be adjusted.

6. The vehicle of claim 1, wherein the conveyor is a chain conveyor.

7. The vehicle of claim 6, wherein chains of the chain conveyor drive guides that move the coarse ore from the loading position to the discharge position.

8. The vehicle of claim 6, wherein the chain conveyor is powered by a separate engine from the drive mechanism.

9. The vehicle of claim 1, further comprising an extension extending from the discharge position of the conveyor.

10. The vehicle of claim 9, wherein the extension is substantially horizontal.

11. The vehicle of claim 9, wherein the extension is capable of moving vertically.

12. A trackless system for transporting coarse ore from a mine face, the system comprising:
    a network comprised of a plurality of vehicles, each vehicle as defined in claim 1,
       wherein the vehicles are arranged so that the discharge position of each conveyor in the network is positioned near the loading position of an adjacent conveyor, except for the vehicle positioned furthest from the mine face in the network of vehicles;
       wherein the vehicle positioned furthest from the mine face in the network of vehicles further comprises an extension extending from the discharge position of the conveyor; and
       wherein the extension transfers the coarse ore to a chute suspended from the roof of a mine.

13. A method of transporting coarse ore from a mine face comprising the steps of:
    loading coarse ore onto the conveyor of a vehicle in a network comprised of a plurality of vehicles, each vehicle as defined in claim 1;
    moving the coarse ore from the loading position to the discharge position of the conveyor; and
    discharging the coarse ore from the conveyor into a loading area;
       wherein the loading area is a chute suspended from the roof of a mine.

14. The method of claim 13, wherein a plurality of vehicles are provided to form a network where the discharge position of each vehicle in the network is aligned with the loading position of an adjacent vehicle, except for the vehicle positioned furthest from the mine face in the network of vehicles.

* * * * *